US012474255B2

(12) United States Patent
Sahiri et al.

(10) Patent No.: US 12,474,255 B2
(45) Date of Patent: Nov. 18, 2025

(54) DEVICE FOR A LIGHT-SPECTROSCOPIC ANALYSIS

(71) Applicant: Implen GmbH, Munich (DE)

(72) Inventors: Martin Sahiri, Zorneding (DE); Michael Riepl, Munich (DE)

(73) Assignee: Implen GmbH, Munich (DE)

( * ) Notice: Subject to any disclaimer, the term of this patent is extended or adjusted under 35 U.S.C. 154(b) by 123 days.

(21) Appl. No.: 17/989,404

(22) Filed: Nov. 17, 2022

(65) Prior Publication Data
US 2023/0087956 A1 Mar. 23, 2023

Related U.S. Application Data

(63) Continuation of application No. 17/259,141, filed as application No. PCT/EP2019/070044 on Jul. 25, 2019, now Pat. No. 11,525,771.

(30) Foreign Application Priority Data

Jul. 26, 2018 (DE) ...................... 10 2018 212 489.2

(51) Int. Cl.
*G01N 21/25* (2006.01)
*G01N 21/31* (2006.01)
*G01N 21/64* (2006.01)

(52) U.S. Cl.
CPC ........... *G01N 21/255* (2013.01); *G01N 21/31* (2013.01); *G01N 21/645* (2013.01); *G01N 2021/6417* (2013.01)

(58) Field of Classification Search
CPC .... G01N 21/255; G01N 21/31; G01N 21/645; G01N 2021/6417
See application file for complete search history.

(56) References Cited

U.S. PATENT DOCUMENTS

| 6,519,032 | B1 | 2/2003 | Kuebler et al. |
| 6,956,695 | B2 * | 10/2005 | Tafas ..................... G02B 21/16 |
| | | | 356/244 |
| 6,969,835 | B1 | 11/2005 | Rushbrooke et al. |
| 9,089,828 | B2 | 7/2015 | Howell et al. |
| 2002/0001078 | A1 | 1/2002 | Gobel et al. |
| 2002/0141050 | A1 | 10/2002 | Tafas et al. |
| 2003/0117628 | A1 | 6/2003 | Harju et al. |

(Continued)

FOREIGN PATENT DOCUMENTS

| CN | 1412544 A | 4/2003 |
| CN | 101506643 A | 8/2009 |

(Continued)

OTHER PUBLICATIONS

PCT/EP2019/070044 filed Jul. 25, 2019 International Search Report dated Nov. 14, 2019.

(Continued)

*Primary Examiner* — Michael A Lyons
*Assistant Examiner* — Jarreas Underwood
(74) *Attorney, Agent, or Firm* — Rutan & Tucker LLP

(57) ABSTRACT

The invention relates to a device for a light-spectroscopic analysis of a, for example, liquid sample. In particular, light should be guided through a sample and then detected and/or analyzed photometrically, spectrophotometrically, fluorometrically, spectrofluorometrically and/or by means of phosphorescence or luminescence.

23 Claims, 5 Drawing Sheets

(56) References Cited

U.S. PATENT DOCUMENTS

| | | |
|---|---|---|
| 2003/0142309 A1* | 7/2003 | Kuebler ................ G01N 30/16 |
| | | 356/338 |
| 2003/0151743 A1 | 8/2003 | Fernando et al. |
| 2005/0213868 A1 | 9/2005 | Cunningham |
| 2008/0014571 A1 | 1/2008 | Teich et al. |
| 2010/0007891 A1* | 1/2010 | Carroll ............... G01N 33/2823 |
| | | 250/341.8 |
| 2011/0001968 A1 | 1/2011 | Kirschner et al. |
| 2011/0059016 A1 | 3/2011 | Ramanujam et al. |
| 2012/0002190 A1 | 1/2012 | Laitinen et al. |
| 2012/0014835 A1 | 1/2012 | Howell et al. |
| 2012/0027044 A1 | 2/2012 | Laitinen et al. |
| 2012/0156767 A1* | 6/2012 | Renna .................. B01L 3/5088 |
| | | 428/704 |
| 2012/0190034 A1* | 7/2012 | Tajima ................. G01J 3/4406 |
| | | 435/6.12 |
| 2013/0228675 A1 | 9/2013 | Chen et al. |
| 2013/0330230 A1* | 12/2013 | Uri ....................... G01N 21/553 |
| | | 422/69 |
| 2014/0005078 A1* | 1/2014 | Howell ............... G01N 21/253 |
| | | 506/39 |
| 2015/0064699 A1 | 3/2015 | Wietzorrek |
| 2015/0317507 A1 | 11/2015 | Liebel et al. |
| 2017/0030827 A1 | 2/2017 | Nickel et al. |
| 2017/0100715 A1 | 4/2017 | Cherubini et al. |
| 2017/0246635 A1 | 8/2017 | Buermann et al. |
| 2021/0250520 A1* | 8/2021 | Edwards ............. H04N 23/695 |
| 2021/0270726 A1 | 9/2021 | Sahiri et al. |

FOREIGN PATENT DOCUMENTS

| | | | |
|---|---|---|---|
| CN | 101625320 A | 1/2010 | |
| CN | 101981435 A | 2/2011 | |
| CN | 102341694 A | 2/2012 | |
| CN | 206740649 U | 12/2017 | |
| DE | 102012022603 B3 | 5/2014 | |
| EP | 0266881 A2 | 5/1988 | |
| GB | 2351555 A | 1/2001 | |
| WO | WO-2007001084 A1 * | 1/2007 | ........... G01N 35/025 |
| WO | 15082611 A1 | 6/2015 | |

OTHER PUBLICATIONS

U.S. Appl. No. 17/259,141, filed Jan. 8, 2021 Advisory Action dated Aug. 16, 2022.

U.S. Appl. No. 17/259,141, filed Jan. 8, 2021 Final Office Action dated May 26, 2022.

U.S. Appl. No. 17/259,141, filed Jan. 8, 2021 Non-Final Office Action dated Jan. 13, 2022.

U.S. Appl. No. 17/259,141, filed Jan. 8, 2021 Notice of Allowance dated Sep. 2, 2022.

* cited by examiner

DEVICE FOR A LIGHT-SPECTROSCOPIC ANALYSIS

PRIORITY

This application is a continuation application of U.S. patent application Ser. No. 17/259,141, filed Jan. 8, 2021, filed as a U.S. national stage of International Application No. PCT/EP2019/070044, filed Jul. 25, 2019, now U.S. Pat. No. 11,525,771, which claims the benefit of priority to DE 10 2018 212 489.2, filed Jul. 26, 2018, each of which is incorporated by reference in its entirety into this application.

TECHNICAL FIELD

The invention relates to a device for a light-spectroscopic analysis of a, for example, a liquid sample. In particular, light is to be passed through a sample and subsequently detected and/or analyzed photometrically, fluorometrically, spectrofluorometrically and/or by means of phosphorescence or luminescence.

PRIOR ART

Known as a device of the same category is the device according to WO 2015/082611 A1, which is provided for the light-spectroscopic analysis of a small amount of a liquid sample. The device of WO 2015/082611 A1 comprises: a receiving point for applying a small amount of the liquid sample, and light guides that guide light from a light source to the sample and signal light from the sample in the direction of a detector. This device is further characterized in that an illumination source is provided underneath the receiving point, and a region is provided below the receiving point, which is permeable for the light of the illumination source such that the illumination light illuminates the receiving point.

SUBJECT MATTER OF THE INVENTION

The invention aims at providing a device for a light-spectroscopic analysis with high performance which is configured in a compact manner.

The invention provides for this purpose a device having the features according to claim 1. Further preferred embodiments are stated in the dependent claims and/or the following description.

The device is suitable for a light-spectroscopic analysis and comprises: a base, to which a sample carrier for holding a sample can be mounted or is mounted, a first measuring head configured to guide light generated by a light source to a sample received by the sample carrier and to receive signal light from the sample held by the sample carrier and guide it to a detector, a second measuring head configured to guide light generated by a light source to a sample received by the sample carrier and to receive signal light from the sample held by the sample carrier and guide it to a detector, wherein the first measuring head and the second measuring head are movable relative to the base.

The device according to the invention in particular has the advantage that the first and second measuring heads allow a compact arrangement of the device. In particular, movement paths can be reduced. In addition to a compact design, a high a degree of measurement accuracy can be ensured.

According to one embodiment, the device moreover comprises the light source for providing the light to the first measuring head and/or second measuring head. In this connection, it is preferred according to a further embodiment that the light source comprises a Xenon lamp, in particular a Xenon flash lamp. A very high quality analysis is thus guaranteed.

It is preferred that the device further comprises the detector for the analysis of the signal light from the first measuring head and/or the second measuring head. It can thereby be provided that the detector is a spectrometer, in particular a fluorescence spectrometer or a luminescence spectrometer. These measures also guarantee a possibility for an excellent quality analysis.

Moreover, the first measuring head and the second measuring head can be mounted to a carriage such that a compact and structurally more stable and more simple configuration is provided.

In one embodiment, it is provided that the light source and/or the detector is/are also mounted to the carriage. In this manner, the accuracy and stability of the optical alignment of these components can be improved and the assembly space further reduced.

It is preferred that the device comprises a linear motor to drive the carriage. This enables an extremely precise and low-vibration feed possibility for moving the carriage.

In one embodiment, a hanging configuration is provided. The carriage can thereby comprise one or more guide members to guide the carriage in a hanging manner. Thus, a device with extremely small dimensions can be provided for practical use for analysis.

The first measuring head and the second measuring head are spaced apart from each other such that in each case only one of the measuring heads can perform a light-spectroscopic analysis on a sample received by the sample carrier. Errors during detection can thus be effectively avoided.

In a further variant, it is provided that the first measuring head and the second measuring head are movable along a translational axis. Further preferably, it is provided that the first measuring head and the second measuring head are movable along a translational axis, particularly preferably along two translational axes. It thus becomes possible to analyze several samples that are disposed, for example, in a lattice-like manner along this axis/these axes. Furthermore, a precise adjusting movement can also be ensured with a cost-effective implementation.

The first measuring head and the second measuring head can be attached to a common measuring head carrier. A stable and compact configuration of the device can thus be ensured.

It is preferred that a light-emitting aperture of the first measuring head and the second measuring head points upwards in the vertical direction during operation of the device. This allows the formation of a particularly ergonomic device.

In one embodiment, it is provided that the device comprises a reflector that is disposed, or positionable, opposite the sample carrier. By means of the reflector integrated accordingly in the device, the excitation light that has already passed through the sample once is reflected back and enables a higher signal yield due to the renewed passage through the sample. The portion of signal light generated in the sample, that is directed away from the detector, is also reflected back and can improve the detection sensitivity (for example by a better signal-to-noise ratio). Last but not least, the reflector also allows a space-saving configuration.

The first measuring head and/or the second measuring head are movable relative to the sample carrier to change the distance between the first measuring head and/or the second measuring head as well as the sample carrier. Thus, in particular, a mechanically operated focusing can be performed.

In a further embodiment, it is provided that the sample carrier has sample positions (sample receivers) outside of which the sample carrier is provided with a hydrophobic coating or a printed structure. This coating or structure prevents the sample from running or flowing off and thus eliminates the need to provide recesses for holding the sample in the sample holder, which are curved optical surfaces and thus difficult to handle. By means of a hydrophobic coating or the printed structure, the possible cleaning of the device is also made considerably easier, and therefore non-productive times can be reduced.

According to a further variant, the device comprises a third measuring head and a fourth measuring head. It can be provided in a preferred variant that the sample carrier can have sample positions in a matrix arrangement, for example a matrix arrangement with 3×5, 4×5 or 4×6 sample positions. With this variant and the above-mentioned further configurations, the performance of the device can be once again significantly increased. In particular, a larger number of samples can be analyzed in one measurement session.

The first measuring head and the second measuring head can form a first pair of measuring heads, and the third measuring head and the fourth measuring head can form a second pair of measuring heads. Owing to the configuration in pairs, the complexity of the system can be reduced and a space-saving configuration ensured.

Preferably, the pairs of measuring heads are movable independently of each other such that a high degree of flexibility can be ensured.

Preferably, a further light source and a further detector are provided for the second pair of measuring heads, and therefore a further evaluation possibility is available.

In one embodiment, it can be provided that the third measuring head and the fourth measuring head are movable along a translational axis. It is further preferred that the third measuring head and the fourth measuring head are movable along two translational axes. Thus, a precise adjusting movement can be guaranteed with a cost-effective implementation.

The invention further relates to the use of a device according to the aforementioned aspects for analyzing one or more samples.

The invention is also directed at a method, in particular a method for the light-spectroscopic analysis using a device, wherein the device comprises a first measuring head and a second measuring head. The method comprises the steps of: analyzing a first sample by the first measuring head, moving the first measuring head and the second measuring head, and analyzing a second sample by the second measuring head. Said steps are in particular performed in the aforementioned sequence.

Furthermore, it can be provided that after the movement of the first measuring head and the second measuring head, an analysis is performed on a further sample by the first measuring head.

DESCRIPTION OF THE PREFERRED EMBODIMENT

In the following, preferred embodiments will be described for illustrating the invention. Even though the described embodiments are to be understood purely as examples, and are not restrictive, features of the embodiments can also be used individually to specify the invention. Modifications of certain features of the preferred embodiments can be combined with variants of other features in order to form further embodiments.

Figure 1:
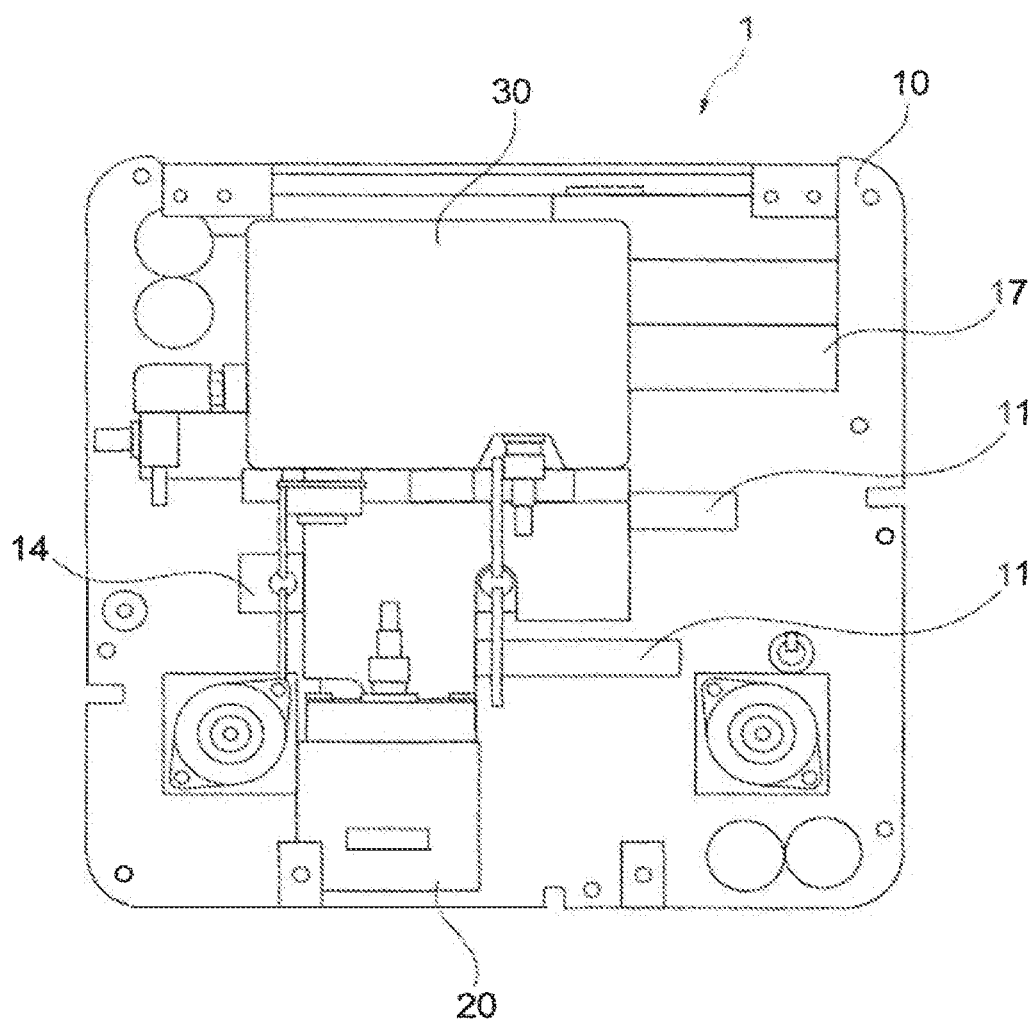
FIG. 1 shows a first embodiment of a device according to the invention.

FIG. 1 shows one embodiment of a device 1 that is provided for a light-spectroscopic analysis. The device 1 is shown without a housing in order to explain the components of the device 1 more clearly. However, to protect the components of the device 1, they are accommodated in such a housing in the practical implementation.

The device 1 comprises a base 10 which constitutes an upper side of such a housing of the device or is received adjacent to the upper side within such a housing. A sample carrier 16 is provided on the outwardly facing (upper) side of the base 10 or on the upper side of the housing, wherein the sample carrier 16 receives one or more samples. A power source 17, for example a rechargeable battery, is disposed on the base 10.

Figure 2:
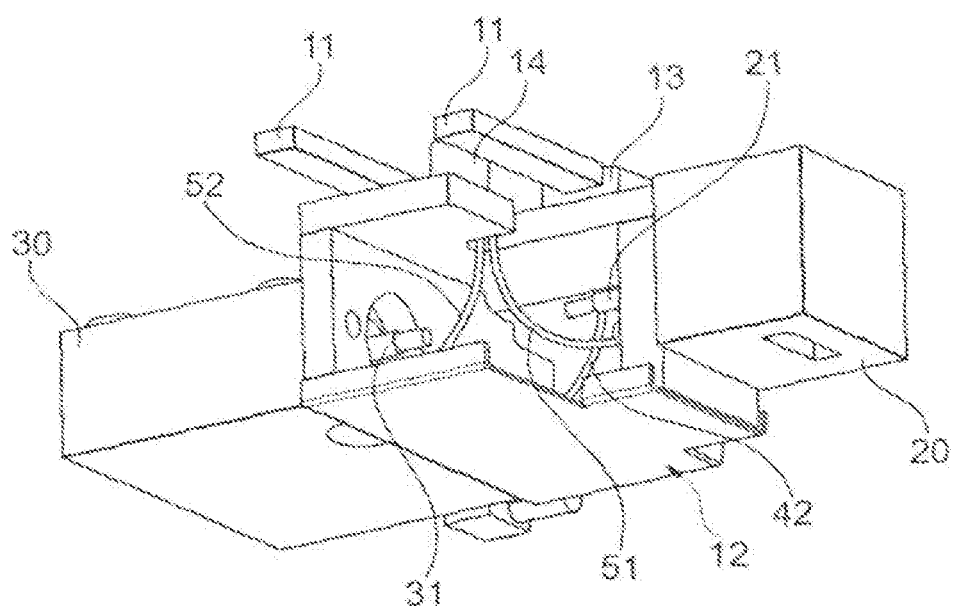
FIG. 2 is a perspective partial view of the embodiment according to FIG. 1.

The device 1 further comprises rails 11 along which a carriage 12 is movable, wherein the carriage 12 comprises guide members 13 engaging with the rails 11 (cf. FIG. 2). The carriage 12 is thereby arranged in the device 1 in a hanging manner and is provided below the rails 11 when the device 1 is in the use state.

Mounted to the carriage 12 is a light source 20 which, in the present embodiment, is a Xenon flash lamp. According to a modification of the embodiment, the light source 20 can also be configured as an LED lamp (mainly for the VIS and IR range, but recently also UV) or deuterium lamp (especially for the UV range). A detector 30, which in the present embodiment is a spectrometer, is provided on a side of the carriage 12, that is opposite the light source 20.

The light source 20 is used to generate light which, as described below, is emitted onto a sample, penetrates this sample and is then analyzed by the detector after receiving signal light, i.e. light coming from the sample.

For this purpose, a first light line 41 and a second light line 51 are coupled to the light source 20 by means of an SMA connector 21. The first light line 41 is connected to a first measuring head 43, whereas the second light line 51 is coupled to a second measuring head 53. The measuring heads 43, 53 are mounted to a common measuring head carrier 14.

The first measuring head 43 and the second measuring head 53 are movable together along the sample carrier. Moreover, the measuring heads can be adjusted relative to the sample carrier (Z direction) to adapt the focusing of the measuring heads.

The light lines 41, 51 are fiber optic cables that are configured to conduct the light emitted by the light source 20 to the respective measuring head 43, 53.

The first measuring head 43 is in contact with a signal line 42. Accordingly, the second measuring head 53 is connected to a second signal line 52. The first signal line 42 and the second signal line 52 are connected to the detector (spectrometer) by means of a fiber optic connector 31.

The sample carrier 16 is made, for example, of quartz glass and includes several sample positions 16a to receive, in particular, a liquid sample. Each of the sample positions 16a is configured as a window that is transparent for the excitation and signal radiation used. In the illustration in FIG. 1, the sample carrier 16 is provided on the side of the base that is opposite the rails 11, which is not shown.

The sample positions 16a are provided as sections on the sample carrier 16. If there is an uncoated sample carrier, these sections can be formed by wells or recesses in the sample carrier. Alternatively, the sample positions can be defined such that outside the sample position, the sample carrier 16 is provided with a hydrophobic coating, for example silane or Teflon, or a ceramic surface. The sample positions 16a can also be delimited by a printed portion. This ensures that a sample remains in the region of the respective sample position.

Figure 3:
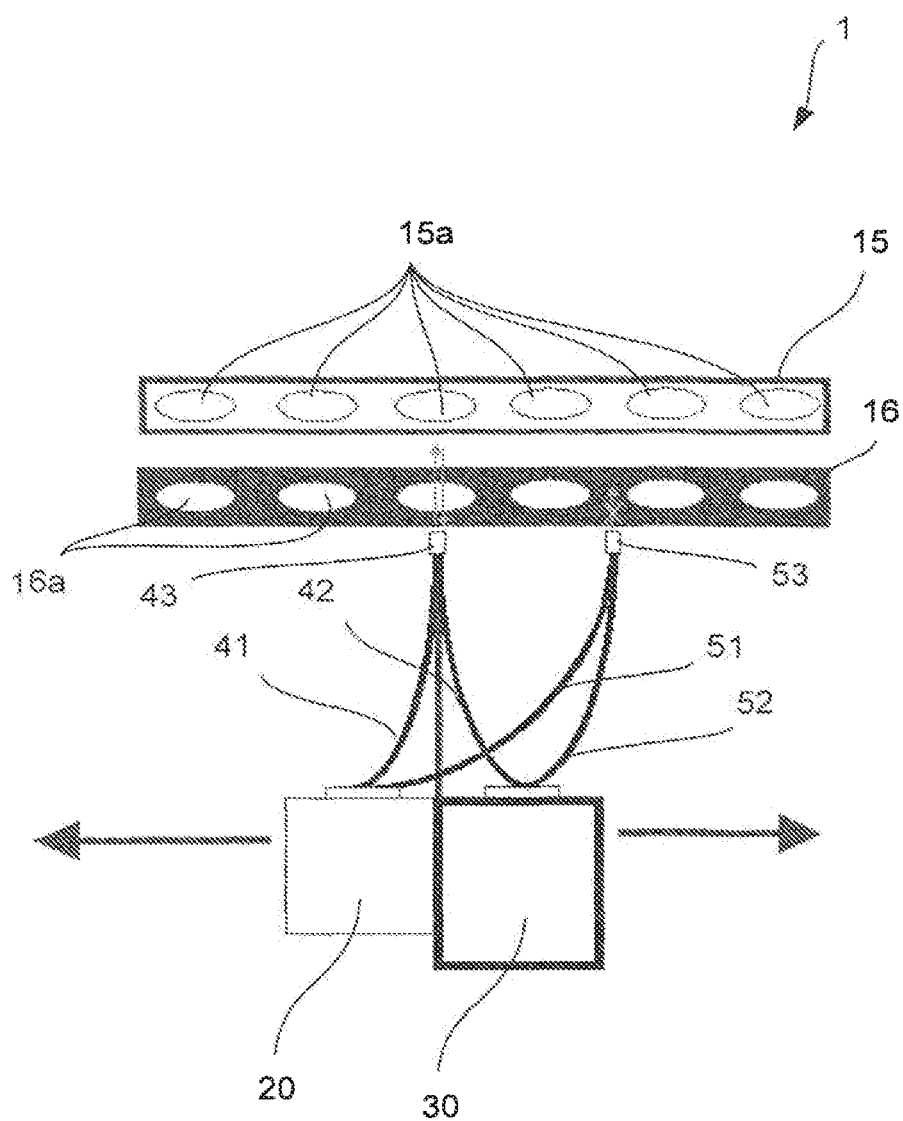
FIG. 3 is a schematic view of the first embodiment of the invention to explain the mode of operation of the device.

On the side of the sample carrier 16 facing away from the first and second measuring heads 43, 53, a reflector 15 is attached to the base. This reflector has reflector sections 15a, each of which are opposite the sample positions 16a. In the schematic view of FIG. 3, the function of the device 1 is clearly illustrated. Excitation light sent through the light lines 41, 51 is passed by the measuring head 43, 53 through a sample position 16a and the sample located therein, reflected by the corresponding mirror section 15a and then sent through the sample again. Each time the excitation light passes through, the sample is excited and caused to generate signal light. This signal light is then fed back from the measuring head 43, 53 into the signal fibers 42, 52 and is directed further to the detector 30.

It can be seen that the first measuring head 43 and the second measuring head 53 are spaced from each other such that always only one of the measuring heads can be positioned opposite an opening 16a of the sample carrier 16.

As stated before, the carriage 12 which accommodates the light source 20, the detector 30, the light line 41, 51, the signal lines 42, 52 and the measuring heads 43, 53, is movable along the rails 11 in a translational movement.

The light lines 41, 51 and the signal lines 42, 52 are configured such that they can be deformed in a certain bending radius. Due to the distance of the measuring heads 43, 53, it is provided that the first measuring head 43, in the example of FIG. 3, can analyze the sample positions 16a on the left side of the sample carrier 16, whereas the second measuring head 53 is provided for the sample positions 16a located on the right side in FIG. 3. It is thus ensured that only one of the measuring heads 43, 53 performs an analysis.

Figure 4:
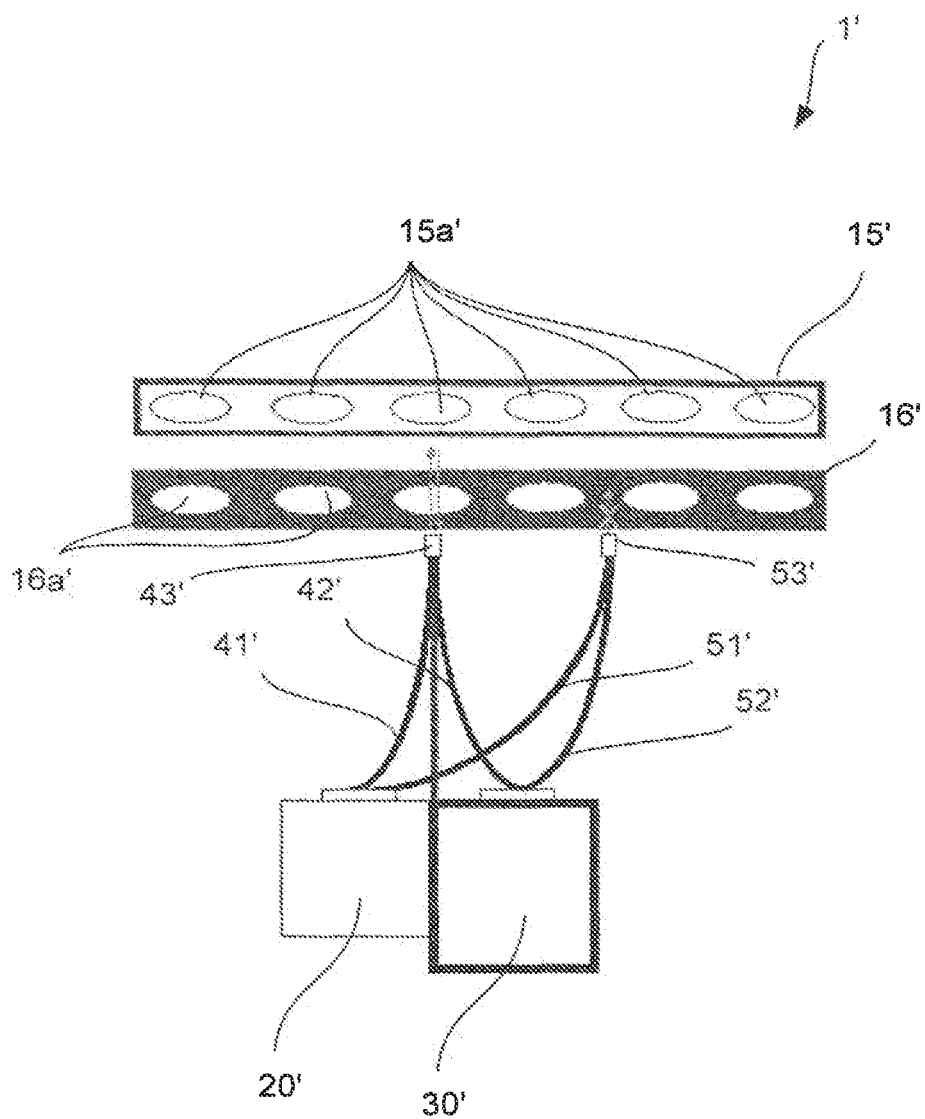
FIG. 4 shows a schematic view of a second embodiment.

A second embodiment of a device 1' according to the invention is described by the schematic illustration of FIG. 4. The device 1' can be configured as shown in FIGS. 1 to 2.

Like the first embodiment, the device 1' comprises a light source 20' as well as a detector 30'. The light source 20' is connected to a first light line 41' having a first measuring head 43' and to a second light line 51' having a second measuring head 53'. Starting from the first measuring head 43', a signal line 42' is connected to the detector 30'. A second signal line 52' is also provided to couple the second measuring head 53' to the detector 30'.

Similar to the first embodiment, a sample carrier 16' with openings 16a' is provided, wherein a reflector 15' with reflector sections 15a' can be arranged opposite the sample carrier 16'.

The second embodiment primarily differs from the first embodiment in that the light source 20' and the detector 30' are not mounted to a carriage but are arranged so as to be stationary in the housing of the device 1'.

Regarding further features or detailed explanations of the features stated in relation to the second embodiment, reference is made to the previous explanations.

A further variant is described below by means of the top view of a third embodiment shown in FIG. 5.

The device of the third embodiment comprises a plurality of sample positions 16a" that are arranged in a matrix-like manner. Specifically, 4×5 sample positions 16a" are provided, wherein a different number of sample positions 16a", for example 4×4, 4×6, etc., can also be provided according to further modifications of the third embodiment.

The device of the third embodiment comprises four measuring heads 43", 53", 63", 73". The measuring heads 43", 53", 63", 73" are coupled to each other and spaced relatively from one another such that always only one of the measuring heads detects a sample located at a sample position 16a" and accordingly only this measuring head emits a corresponding measuring signal.

Figure 5:
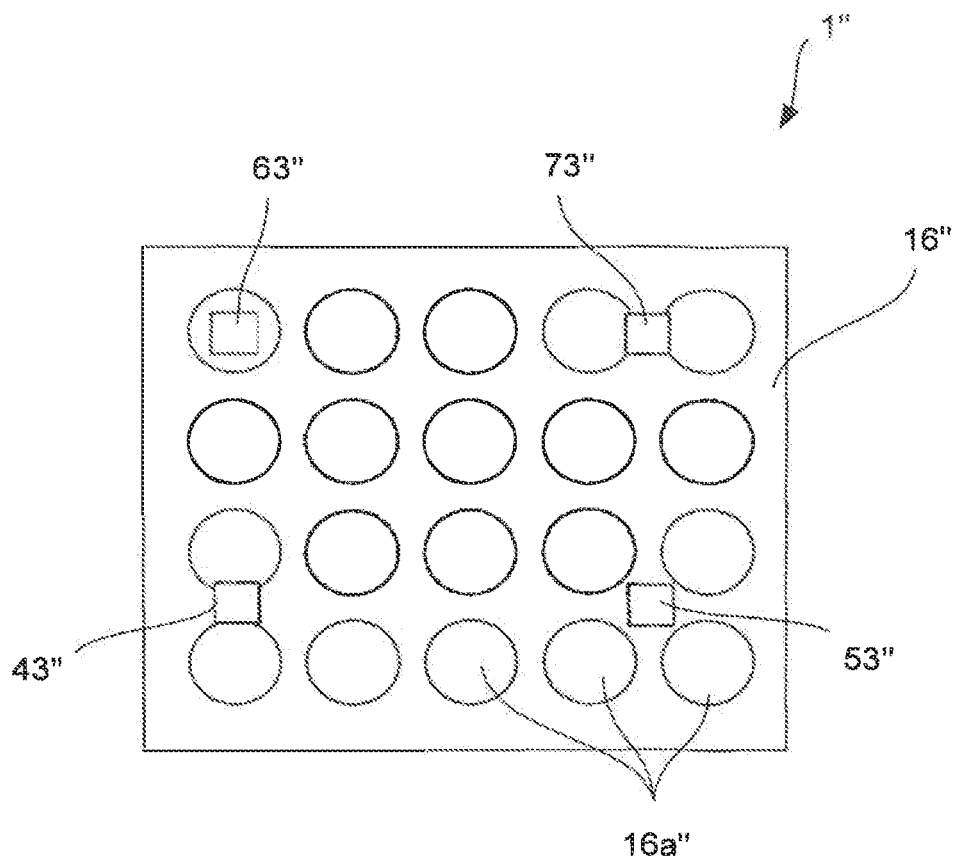
FIG. 5 shows a schematic top view of a third embodiment.

The first pair of measuring heads of sample heads 43", 53" as well as the second pair of measuring heads of sample heads 63", 73" are carried by a common carriage and are thus movable in a plane, in particular in the X and Y direction (see also FIG. 5). Moreover, the pairs of measuring heads can be adjusted relative to the sample carrier to change the focusing of the measuring heads.

Regarding further features or detailed explanations of the features mentioned in relation to the third embodiment, reference is made to the previous embodiments.

According to a modification of the third embodiment, it is possible to mount the first pair of measuring heads and the second pair of measuring heads to separate carriages such that the pairs of measuring heads can be moved independently of each other. This increases the flexibility of the device.

What is claimed is:

1. A light-spectroscopic analysis device, comprising:
   a base supporting a sample carrier configured for holding a first sample and a second sample arranged along a first linear axis;
   a light source;
   a detector;
   a first measuring head configured to direct a first excitation light from the light source to the first sample, and to guide a first signal light from the first sample to the detector; and
   a second measuring head configured to guide a second excitation light from the light source to the second sample and to guide a second signal light from the second sample to the detector; wherein the first measuring head and the second measuring head are together movable, relative to the base, along the first linear axis, and wherein the first measuring head and the second measuring head are arranged along the first linear axis in a spaced apart relationship such that only one of the first measuring head is aligned with the first sample, or the second measuring head is aligned with the second sample.

2. The device according to claim 1, further comprising a first fiber optic cable configured to guide the first excitation light from the light source to the first measuring head, a second fiber optic cable configured to guide the first signal light from the first measuring head to the detector, a third fiber optic cable configured to guide the second excitation light from the light source to the second measuring head, and a fourth fiber optic cable configured to guide the second signal light from the second measuring head to the detector.

3. The device according to claim 1, wherein the light source comprises a Xenon flash lamp.

4. The device according to claim 1, wherein the detector is a fluorescence spectrometer or a luminescence spectrometer configured to analyze the first signal light or the second signal light.

5. The device according to claim 1, wherein the first measuring head and the second measuring head are movable along a second linear axis extending normal to the first linear axis.

6. The device according to claim 5, wherein the first measuring head directs the first excitation light along a third linear axis extending normal to both the first linear axis and the second linear axis, and wherein the second measuring head directs the second excitation light along the third linear axis.

7. The device according to claim 6, further comprising a reflector disposed on an opposite side of the first sample from the first measuring head, arranged along the third linear axis.

8. The device according to claim 6, wherein one or both of the first measuring head and the second measuring head are movable along the third linear axis to change a distance between the first measuring head and the first sample, or between the second measuring head and the second sample.

9. The device according to claim 5, further comprising a third measuring head arranged along the second linear axis relative to the first measuring head, and a fourth measuring head arranged along the second linear axis relative to the second measuring head, and wherein the sample carrier has three or more samples arranged in a matrix configuration.

10. The device according to claim 9, wherein the first measuring head and the second measuring head are in a fixed relationship relative to each other, and wherein the third measuring head and the fourth measuring head are in a fixed relationship relative to each other.

11. The device according to claim 1, wherein the sample carrier includes a first sample position for receiving the first sample, and a second sample position for receiving the second sample, a portion of the sample carrier outside of the first sample position and the second sample position includes a hydrophobic coating or a printed structure.

12. The device according to claim 1, wherein the first measuring head, the second measuring head, the light source, and the detector are mounted on a carriage, which is movable with respect to the base and the sample carrier.

13. A light-spectroscopic analysis method, comprising:
directing excitation light from a light source to a first measuring head and a second measuring head arranged along a first linear axis in a spaced apart relationship such that only one of the first measuring head is aligned with a first sample, or the second measuring head is aligned with a second sample;
receiving a first reflected light to the first measuring head while preventing receiving the first reflected light to the second measuring head, to analyze the first sample by a detector;
moving the first measuring head and the second measuring head together along the first linear axis; and
receiving a second reflected light to the second measuring head while preventing receiving the second reflected light to the first measuring head, to analyze the second sample by the detector, the first sample and the second sample aligned along the first linear axis.

14. The method according to claim 13, further including a first fiber optic cable directing excitation light from the light source to the first measuring head and a second fiber optic cable directing excitation light from the light source to the second measuring head.

15. The method according to claim 13, wherein the light source comprises a Xenon flash lamp.

16. The method according to claim 13, wherein the detector includes a fluorescence spectrometer or a luminescence spectrometer.

17. The method according to claim 13, wherein the first measuring head and the second measuring head are in a fixed spaced apart relationship relative to each other.

18. The method according to claim 13, further including moving the first measuring head and the second measuring head along a second linear axis extending perpendicular to the first linear axis.

19. The method according to claim 18, further including directing excitation light from the first measuring head or the second measuring head along a third linear axis extending normal to both the first linear axis and the second linear axis.

20. The method according to claim 19, further including reflecting excitation light from the first measuring head off of a reflector back through the first sample and back to the first measuring head, the reflector disposed on an opposite side of the first sample from the first measuring head and arranged along the third linear axis.

21. The method according to claim 19, further including moving one or both of the first measuring head and the second measuring head along the third linear axis to change a distance between the first measuring head and the first sample, or between the second measuring head and the second sample.

22. The method according to claim 13, further including retaining the first sample at a first sample position and retaining the second sample at a second sample position on a sample carrier, a portion of the sample carrier outside of the first sample position and the second sample position includes a hydrophobic coating or a printed structure.

23. The method according to claim 22, wherein the first measuring head, the second measuring head, the light source and the detector are mounted on a carriage, which is movable with respect to the sample carrier.

* * * * *